(12) United States Patent
Kustermann

(10) Patent No.: US 6,248,174 B1
(45) Date of Patent: Jun. 19, 2001

(54) PAINT CURTAIN APPLICATOR

(75) Inventor: Martin Kustermann, Heidenheim (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/235,789

(22) Filed: Jan. 22, 1999

(30) Foreign Application Priority Data

Jan. 28, 1998 (DE) .............................................. 198 03 240

(51) Int. Cl.[7] ...................................................... B05C 5/02
(52) U.S. Cl. ...................... 118/665; 118/679; 118/688; 118/708; 118/712; 118/713; 118/DIG. 4
(58) Field of Search ................................ 118/DIG. 4, 712, 118/713, 665, 672, 674, 676, 679, 680, 681, 688, 689, 708, 419; 427/420, 8, 9

(56) References Cited

U.S. PATENT DOCUMENTS

| | | | |
|---|---|---|---|
| 4,249,478 | 2/1981 | Gruener | 118/668 |
| 4,732,776 | 3/1988 | Boissevain | 127/10 |
| 4,804,557 | 2/1989 | Anthony, Jr. et al. | 427/9 |
| 4,930,440 | * | 6/1990 | Shirono | 118/663 |
| 5,624,715 | 4/1997 | Gueggi et al. | 427/420 |
| 5,795,394 | * | 8/1998 | Belotserkovsky et al. | 118/665 |

FOREIGN PATENT DOCUMENTS

| | | |
|---|---|---|
| 34 24 884 C1 | 7/1984 | (DE) . |
| 39 25 016 C2 | 7/1989 | (DE) . |
| 42 03 398 A1 | 2/1992 | (DE) . |
| 43 18 953 A1 | 5/1993 | (DE) . |
| 196 27 465A1 | 6/1996 | (DE) . |
| 0 517 223 B1 | 6/1992 | (EP) . |

* cited by examiner

*Primary Examiner*—Laura Edwards
(74) *Attorney, Agent, or Firm*—Taylor & Aust, P.C.

(57) ABSTRACT

An apparatus for direct or indirect application of liquid or pasty coating medium onto a traveling material web, notably of paper or cardboard, includes a paint curtain applicator mechanism and at least one sensor unit to register the flow quantity of the coating medium layer applied onto the material web and to provide a corresponding flow quantity signal. At least one regulation device regulates at least one manipulated variable of the paint curtain applicator mechanism upon which the flow quantity of the coating medium layer applied onto the material web depends. A control unit, which receives the flow quantity signal provided by the at least one sensor device, determines at least one face value for the at least one manipulated variable and controls the at least one regulation device on the basis of the at least one manipulated variable-face value.

15 Claims, 1 Drawing Sheet

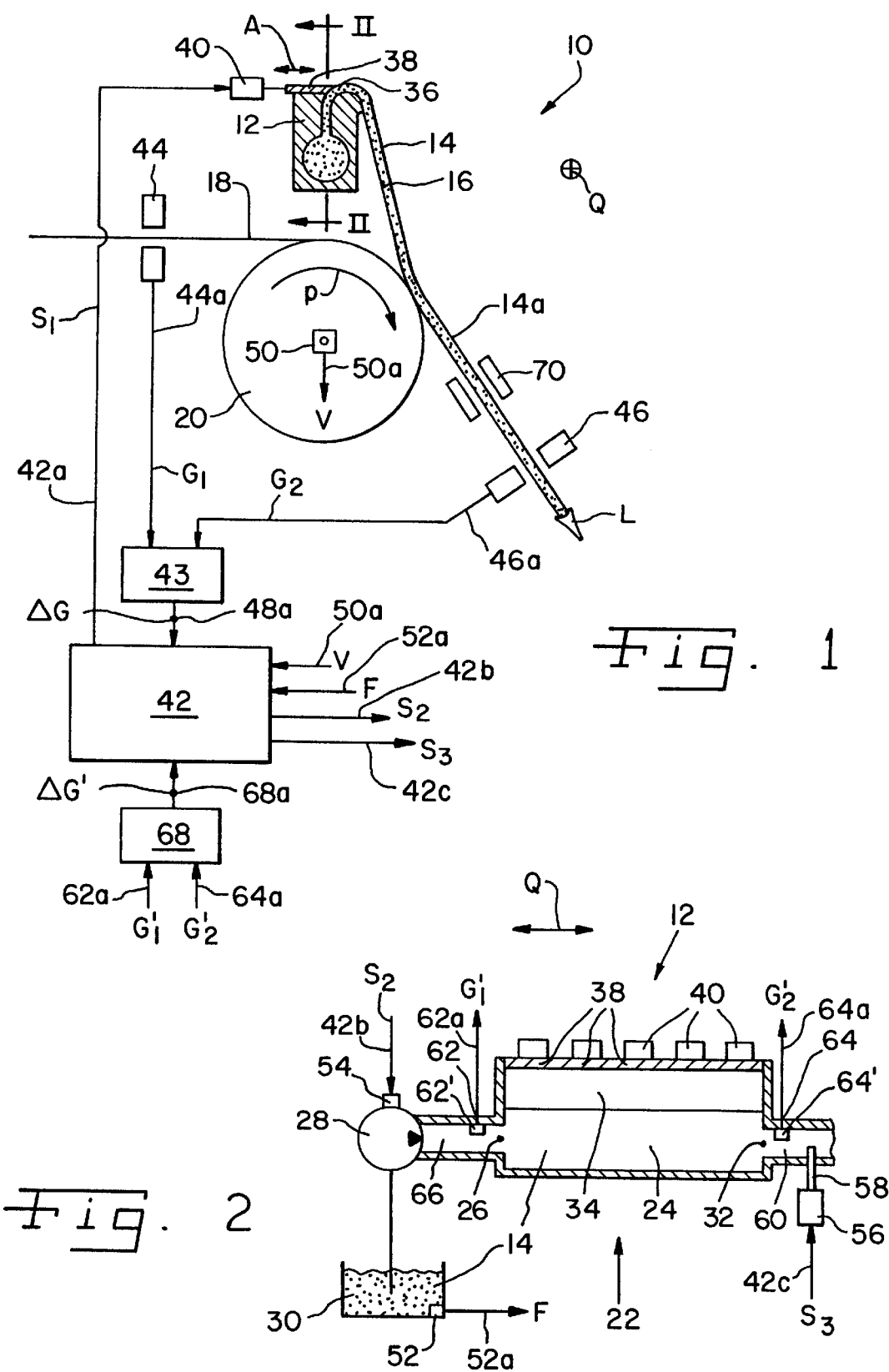

PAINT CURTAIN APPLICATOR

BACKGROUND OF THE INVENTION

1. Field of the Invention

This invention relates to an apparatus in which liquid or pasty coating medium is applied directly or indirectly onto a traveling material web, especially of paper or cardboard.

2. Description of the Related Art

The application of liquid or pasty coating medium by use of a paint curtain or paint veil, the so-called "curtain coating" itself, is already known. U.S. Pat. No. 5,624,715, for example, shows a paint curtain applicator mechanism for the direct coating of a material web. To put it more precisely, U.S. Pat. No. 5,624,715 deals with the impairment/disturbance problem of the coating medium-veil's even distribution onto the material web caused by the carried-on air of the traveling material web. Furthermore, from the German patent document no. EP 0 517 223 B1, an apparatus is known with the help of which air bubbles are to be removed from the coating medium in the run-up of the application process so that the bubbles cannot influence the regularity/evenness of the application.

A further problem, which arises during "curtain coating," and with which the above mentioned printing does not deal, is the dosage of the coating medium. Usually, the coating medium applied by use of curtain coating is not metered out by a subsequent doctor device, so high demands are made on the measured emission/discharge of the coating medium from the paint curtain applicator mechanism.

SUMMARY OF THE INVENTION

The present invention provides an apparatus for direct or indirect application of liquid or pasty coating medium onto a traveling material web, especially of paper or cardboard. Besides a paint curtain applicator mechanism, this apparatus includes at least one sensor equipment to register the flow quantity of the applied coating medium layer and to prepare a corresponding flow-quantity signal. Additionally, it includes at least one regulator device to change at least one manipulated variable of the paint curtain applicator mechanism, of which the flow quantity of the applied coating-medium-layer onto the material web depends. Finally, it includes a regulation unit which receives the prepared flow-quantity signal from at least one sensor device, which, dependent on this flow quantity signal, determines at least one face value for the at least one manipulated variable. The sensor transmits the at least one manipulated variable-face value to the at least one regulator device.

Through the inventional planned flow quantity regulation, the coating medium can be emitted well-dispensed from the paint curtain applicator mechanism so that the desired even layer application onto the material web results. Furthermore, inventional planned flow quantity regulation is constructed in a simple way, because it does not monitor each of the application result influencing parameters separately, nor does it maintain them at a preset face values. Rather, dependent on the registration of the flow quantity, it regulates the per unit time dispensed quantity of the coating medium. The paint curtain applicator mechanism can, for example, include a distribution arrangement which evenly distributes the coating medium in cross direction of the material web. The distribution arrangement, for this purpose, includes a distribution channel, a supply opening/feed opening for introducing the coating medium into the distribution channel, at least one outflow/exit slot for evenly depositing the coating medium in the form of a coating-medium-curtain or veil, as well as, if desired, a depositing opening to divert superfluous coating medium which has been introduced into the distribution channel.

In order to be able to ensure the application's evenness not only in lengthwise direction of the material web, but also in its cross direction, it is suggested to influence the coating medium quantity, which is emitted per unit time from the paint curtain applicator mechanism by several successive application sections installed in cross direction of the material web and which are independent from each other. This can, for example, be carried out by ensuring that the regulator device includes some regulator units which are arranged in cross direction of the material web in order to adjust, section by section, the width of the least one outflow exit slot of the paint curtain applicator mechanism.

In a majority of cases, however, it will suffice to adjust the overall coating medium quantity which has been emitted from the paint curtain applicator apparatus per unit time to a desired value. For this purpose, the regulator device can include, for example, a device to adjust the output conveying capacity of the coating-medium-pump, which has been assigned to the paint curtain applicator apparatus. Additionally or alternatively, the regulator device can include a valve arrangement to influence the quantity of the coating medium which is introduced per unit time through the supply opening feed opening into the distribution channel. Again, additionally or alternatively, the regulator device can include a regulator unit to adjust the width of the at least one exit slot of the paint curtain applicator apparatus. Furthermore, it is possible for the regulator device to include a valve arrangement to influence the exit opening redischarged fraction of the coating medium which is introduced into the distribution channel via the feed supply opening.

The flow-quantity-sensor-equipment can be developed for the direct or indirect registration of the flow quantity of the coating medium layer applied onto the material web.

For a direct registration, the flow quantity sensor equipment can display a first sensor unit which is arranged in running course direction of the material web in front of the paint curtain applicator apparatus, and it can provide a first sensor signal. Furthermore, it can display a second sensor unit, which is arranged in running direction of the material web behind the paint curtain applicator apparatus and provides a second sensor signal. Finally, it can display a difference formation unit which deducts the first sensor signal from the second one and provides the difference signal as the flow quantity signal.

Through this process, the first sensor unit measures the characteristics properties of the material web in its rough state natural condition, i.e., before the herein discussed coating process, which, however, does not exclude that the material web has been coated already once or several times. The second sensor unit measures the achieved final condition so that the coating is reflected as such in the difference of the two measured signals. The running time of the material web between the first sensor unit and the second sensor unit can be taken into consideration through the formation of the difference signal. In principle, however, it is also possible to assume that the signals produced by the two sensor units are quasi stationary signals which change only slowly, so that the running time does not have to be considered.

The flow quantity can be determined, for example by an optical measuring procedure, during which the luminous reflectance or the coefficient of transmission of the material web can be measured. But there are also known radioactive measuring procedures, during which the radiation extinction of a radioactive source, usually a radiation source, of known intensity is determined through the material web. The latter measuring method can be calibrated from time to time by putting the radiation source next to the material web or by determining the intensity of the not evaporated radioactive sources. All the above mentioned measuring procedures are suitable for determining the flow quantity, independent from its locale in cross direction of the material web. For this purpose, for example, a measuring head along a guide running in cross direction of the material web can be moved back and forth.

An indirect flow quantity registration can be effected, for example, by use of a flow quantity sensor device, which includes a first sensor unit assigned to the feed opening of the distribution device (i.e., a sensor unit which, if desired, is arranged to be located possibly a larger distance away from the distribution device but stands in sensor connection with the distribution device). A second sensor unit is assigned to the exit opening of the distribution device and a difference formation unit deducts the sensor signals provided by the sensor unit from each other and provides the difference signal as the flow quantity signal. The first sensor unit and the second sensor unit can also be arranged in pipes, cables or carriers which lead at the feed or exit opening into the distribution channel. However, they can also be furnished directly at the feed or exit opening.

At the above discussed indirect flow quantity measurements, the first and second sensor units can each include a volume flow meter device. But it is also possible for the first and second sensor units to each include a mass flow meter device. For further improvement of the flow quantity registrations precision, it is suggested that the inventional applicator apparatus include a sensor device to register the operation speed of the material web or a sensor device to register the solid substance content of the coating medium, that is to say, of the coated material web width. In addition to this, a drying device can be provided in running direction of the material web after the paint curtain applicator apparatus for direct flow quantity registration. This drying device is preferably arranged in front of the second sensor unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a rough, schematic view of the inventional paint curtain applicator apparatus; and FIG. 2 is a sectional view along the line II—II of the color-curtain-applicator apparatus according to FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawings and particularly to FIG. 1, an inventional applicator apparatus is generally labeled with 10. It includes an applicator mechanism 12, which applies liquid or pasty coating medium 14 in the form of a paint-curtain or paint-veil 16 onto a material web 18, which is running in direction of the arrow L. In this description demonstration, the material web 18 is, within the area of the applicator mechanism 12, guided around a supporting roll 20 rotating in direction of arrow P. However, there are also other suitable guideways possible.

As demonstrated in FIG. 2, the applicator mechanism 12 includes a distribution arrangement 22 with a distribution channel 24, which is supplied with the coating medium 14 from the coating medium supply 30 via a feed supply opening 26 and a feed pump 28. The majority of the coating medium, which is introduced into the distribution channel 24 via the feed opening 26, is emitted from this distribution channel 24 again via an exit discharge opening 32. Only a small proportion of coating medium 14 is supplied to an exit gap 36 via an exit channel 34, and there it is delivered in the form of a paint veil 16. In this way, it is insured that the application/coating medium is moving in the distribution channel 24 with such a high flow velocity that a depositing of the solid substances contained in the coating medium 14 is reliably avoided.

In order to define the width of the exit gap 36, several arranged sliding elements 38 are designated, which are distributed in cross direction Q of the material web 18, and they can be adjusted by actuators 40 (in the direction of double arrow A in FIG. 1). The sliding elements 38 make possible a section-wise adjustment of the width of the exit gap 36 and, consequently, facilitate profiling the line 14a, which is applied onto the material web 18 in cross direction Q of the material web 18.

The actuators 40 are approached by a control unit 42, which determines the set rated values for the actuators 40 on basis of various sensor signals, which are chosen in such a way that they give information about the flow quantity of the layer applied onto the material web 18. Thus, according to FIG. 1, a first measuring frame 44 can be arranged in running direction L of the material web 18 in front of the application apparatus 12 to measure the properties/characteristics of the uncoated material web 18. A second measuring frame 46, identical with the first measuring frame 44 in set-up and function, can be designated after applicator mechanism 12 in running direction L. Each of the measuring frames 44 and 46 includes a measuring head (not shown), which can be moved back and forth alongside a guide (not shown) in cross direction Q of the material web 18. The way of measurement of the measuring heads measuring frames 44, 46 can be based upon, for example, an optical measurement of the coefficient of absorption or the coefficient of transmission of the material web 18. It is also possible, however, to determine the extinction capability of the material web 18 for radioactive energy, preferably beta radiation.

The first and second measuring frames 44 and 46 prepare flow quantity signals G1 and G2, which are supplied to a differential formation link or comparator 48 via signal carriers 44a and 46a. The differential formation link 48 deducts the flow quantity signal G1 of the first measuring frame 44 from the flow quantity signal G2 of the second measuring frame 42 in order to provide a differential signal $\Delta_G$, which indicates the flow quantity properties of the applied coating layer 14a onto the material web 18. The above-mentioned differential signal $\Delta_G$ is supplied to the control unit 42 via a signal carrier 48a. The control unit 42 determines from this differential signal $\Delta_G$ and, if desired, on the basis of registration signals of more sensors, adjustment signals S1 which are transmitted to actuators 40 via signal carriers 42a.

There is no limit to the number of further sensor signals which can be utilized in addition to the flow quantity signals G1 and G2 of the two measuring frames 44 and 46 or $\Delta_G$ the differential link 48 by the control unit 42 to determine the adjustment signals S1 for the actuators 40. As examples, only two of such sensor signals are listed: namely first, the speed signal V of a velocity sensor 50, which, for example, derives the traveling running speed of the material web 18 from the number of revolutions of the paper cylinder 20, and, secondly, the signal F of a coating medium sensor 52, which gives information about the composition and especially the solid substance coating medium 14 in the coating medium supply 30. These two registration signals V and F are supplied to the control unit 42 via signal carriers 50a or 52a.

The regulation device built by the sliding elements 38 and the affiliated actuators 40 can principally handle by itself the dosage of the discharged coating medium 14 disposed onto the material web 18. Additionally or alternatively, however, the coating medium can also be dispensed via further regulation devices. For example, the conveying capacity output of the delivery pump 28 can be varied in that the control unit 42 issues via signal carrier 42b a corresponding relevant regulation signal S2 to a drive unit 54 of the pump 28. An additional or alternative method of exerting influence is to transmit regulation signal S3 to regulation unit 56 of a valve device 58 via a signal carrier 42c. In the performance examples according to FIG. 2, the valve device 58 is developed as sliding valve and is arranged to an eduction/deposit pipe, which follows the eduction deposit opening 32 of the distribution channel 24. By use of the sliding valve 58, the fraction of the coating medium 14 that is emitted through the outlet gap 36 in the form of the paint curtain 16 to the material web 18, and that is introduced into the distribution channel 24 via the supply opening 26, can be varied.

Besides the above described, direct flow quantity measurement by use of the measuring frames 44 and 46, the flow quantity of the applied layer 14a onto the material web 18 can also be determined indirectly, for example by use of two current meters 62 and 64. One current meter 62 is connected to a supply pipe 66 which leads to a supply opening. The other current meter 64, is attached to the eduction pipe 60. The current meters can be, for example, volume flow metering measuring devices 62 and 64. But it is also possible for them to be mass current or mass flow metering devices 62 and 64. The registration signals $G_1'$ and $G_2'$ of the current meter 62 and 64 or 62' and 64' are forwarded via signal carriers 62a and 64a to a differential formation link or comparator 68, which deducts the signal $G_2'$ of the depositing discharging flow meter 64 from the registration signal $G_1'$ of the supplying flow meter 62. Comparator 68 supplies a differential signal $\Delta_G'$, which provides information about the coating medium emitted through the outlet gap 36 onto the material web 18. This differential signal $\Delta_G'$ is transmitted via a signal carrier 68a to the control unit 42. Control unit 42 may determine from this the flow quantity of the coating layer 14a by consulting further sensor signals, for example via the running traveling speed of the material web 18 or the solid substance content of the coating medium.

It is certainly possible to provide in just one paint curtain coating apparatus 10 both the measuring frames 44 and 46 and the volume current or mass flow meters 62 and 64 in any combination to increase the accuracy of the flow quantity registration by comparing the various flow quantity signals. Furthermore, it is possible to carry out a predosage of the quantity of the coating medium 14, which is emitted onto the material web 18, and to carefully control the amount of this coating medium by use of the sliding devices 38 and the actuators 40. This pre-dosaging can be accomplished by varying the output capacity of the supply pump 28 or the emission deposit cross section profile by influencing the valve device 58.

Between the coating mechanism 12 and the second measuring frame 46, a drying device 70 of known construction can be designated. With the help of this drying device 70, measuring errors, which could be caused, for example, by a still existing humidity in the coating layer, can be decreased or preferably totally avoided.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for application of a coating medium onto a moving fiber web, said apparatus comprising:
    a paint curtain applicator mechanism configured for applying a layer of the coating medium onto the fiber web, said paint curtain applicator mechanism having at least one manipulated variable;
    at least one sensor device configured for sensing an applied coating quantity of the layer of the coating medium applied onto the fiber web, the applied coating quantity being dependent upon said at least one manipulated variable of said paint curtain applicator mechanism, said at least one sensor device being configured for providing at least one applied coating quantity signal corresponding to the applied coating quantity of the layer of the coating medium;
    a control unit configured for receiving said at least one applied coating quantity signal from said at least one sensor device, said control unit being configured for generating at least one face value for said at least one manipulated variable of said paint curtain applicator mechanism, said at least one face value being generated based upon said at least one applied coating quantity signal; and
    at least one regulator device configured for regulating said paint curtain applicator mechanism using said at least one face value, said control unit being configured for controlling said at least one regulator device dependent upon said at least one face value.

2. The apparatus of claim 1, wherein said paint curtain applicator mechanism includes a distribution device configured for evenly distributing the coating medium in a cross direction of the fiber web, said distribution device including:
    a distribution channel;
    a supply opening configured for introducing the coating medium into said distribution channel;
    at least one exit gap in fluid communication with said distribution channel, said at least one exit gap being configured for evenly outputting the coating medium in the form of a coating medium curtain; and
    a discharge opening configured for diverting superfluous quantities of the coating medium from said distribution channel.

3. The apparatus of claim 2, wherein said at least one exit gap of said distribution device has a width, said at least one regulator device including at least one regulation unit configured for regulating said width of said at least one exit gap.

4. The apparatus of claim 3, wherein said at least one regulator device includes a plurality of regulation units distributed in the cross direction of the fiber web, said regulation units being configured for section-wise adjustment of said width of said at least one exit gap.

5. The apparatus of claim 1, further comprising a coating medium pump associated with said paint curtain applicator mechanism, said at least one regulator device including a drive unit configured for regulating an output capacity of said coating medium pump.

6. The apparatus of claim 5, wherein said regulator device includes a supply valve arrangement configured for influencing a quantity of the coating medium that is introduced per unit time through said supply opening into said distribution channel.

7. The apparatus of claim 6, wherein said regulator device includes a discharge valve arrangement configured for influencing a quantity of the coating medium that exits said distribution channel per unit time through said discharge opening.

8. The apparatus of claim 7, wherein said at least one sensor device is configured to register the applied coating quantity of the layer of the coating medium onto the fiber web, said at least one sensor device including:
a first sensor unit disposed before said paint curtain applicator mechanism relative to a direction of movement of the fiber web, said first sensor unit being configured for providing a first sensor signal;
a second sensor unit disposed after said paint curtain applicator mechanism relative to the direction of movement of the fiber web, said second sensor unit being configured for providing a second sensor signal; and
a first differential formation unit configured for calculating a first said applied coating quantity signal by subtracting said first sensor signal from said second sensor signal.

9. A apparatus for application of a coating medium onto a moving fiber web, said apparatus comprising:
a paint curtain applicator mechanism configured for applying a layer of the coating medium onto the fiber web, said paint curtain applicator mechanism having at least one manipulated variable;
a coating medium pump associated with said paint curtain applicator mechanism;
at least one sensor device configured for sensing an applied coating quantity of the layer of the coating medium applied onto the fiber web, the applied coating quantity being dependent upon said at least one manipulated variable of said paint curtain applicator mechanism, said at least one sensor device being configured for providing at least one applied coating quantity signal corresponding to the applied coating quantity of the layer of the coating medium, said at least one sensor device being configured to register the applied coating quantity of the layer of the coating medium onto the fiber web, said at least one sensor device including:
a first sensor unit disposed before said paint curtain applicator mechanism relative to a direction of movement of the fiber web, said first sensor unit being configured for providing a first sensor signal;
a second sensor unit disposed after said paint curtain applicator mechanism relative to the direction of movement of the fiber web, said second sensor unit being configured for providing a second sensor signal; and
a first differential formation unit configured for calculating a first said applied coating quantity signal by subtracting said first sensor signal from said second sensor signal;
a control unit configured for receiving said at least one applied coating quantity signal from said at least one sensor device, said control unit being configured for generating at least one face value for said at least one manipulated variable of said paint curtain applicator mechanism, said at least one face value being generated based upon said at least one applied coating quantity signal; and
at least one regulator device configured for regulating said paint curtain applicator mechanism using said at least one face value, said control unit being configured for controlling said at least one regulator device dependent upon said at least one face value, said at least one regulator device including:
a drive unit configured for regulating an output capacity of said coating medium pump;
a supply valve arrangement having at least one supply opening and configured for influencing a quantity of the coating medium that is introduced per unit time through said at least one supply opening into said distribution channel;
a discharge valve arrangement having at least one discharge opening and configured for influencing a quantity of the coating medium that exits said distribution channel per unit time through said at least one discharge opening;
said at least one sensor device further including:
a third sensor unit connected with said at least one supply opening of said distribution device, said third sensor unit being configured for providing a third sensor signal;
a fourth sensor unit connected with said at least one discharge opening of said distribution device, said fourth sensor unit being configured for providing a fourth sensor signal; and
a second differential formation unit configured for calculating a second said applied coating quantity signal by subtracting said third sensor signal from said fourth sensor signal.

10. The apparatus of claim 9, wherein each of said third sensor unit and said fourth sensor unit includes a respective volume current meter device.

11. The apparatus of claim 9, wherein each of said third sensor unit and said fourth sensor unit includes a respective volume flow meter device.

12. The apparatus of claim 11, wherein said at least one sensor device includes a fifth sensor unit configured for registering a speed of movement of the fiber web.

13. The apparatus of claim 12, wherein said at least one sensor device includes a sixth sensor unit configured for registering one of a solid substance content of the coating medium and a width of the coated fiber web.

14. The apparatus of claim 13, further comprising a drying device disposed after said paint curtain applicator mechanism relative to the direction of movement of the fiber web.

15. An apparatus for application of a coating medium onto a moving fiber web, said apparatus comprising:
a paint curtain applicator mechanism configured for applying a layer of the coating medium onto the fiber web;
at least one sensor device configured for sensing an applied coating quantity of the layer of the coating medium applied onto the fiber web, said at least one sensor device being configured for providing at least one applied coating quantity signal corresponding to the applied coating quantity;

a control unit configured for receiving said at least one applied coating quantity signal from said at least one sensor device, said control unit being configured for generating at least one operative value for said paint curtain applicator mechanism, said at least one operative value being generated based upon said at least one applied coating quantity signal; and at least one regulator device configured for regulating said paint curtain applicator mechanism using said at least one operative value, said control unit being configured for controlling said at least one regulator device dependent upon said at least one operative value.

* * * * *